United States Patent Office 3,546,097
Patented Dec. 8, 1970

3,546,097
FOULING INHIBITORS AND PROCESSES FOR USING THEM
George B. Tupper, Groves, Tex., assignor to Texaco Inc., New York, N.Y., a corporation of Delaware
No Drawing. Filed Dec. 27, 1968, Ser. No. 787,564
Int. Cl. C10g 9/16; C10i 1/14
U.S. Cl. 208—48
20 Claims

ABSTRACT OF THE DISCLOSURE

A process for inhibiting fouling in chemical processing and oil refining equipment comprising incorporating into said equipment an anti-fouling amount of an admixture comprising:
(a) an alkyl methacrylate polymer selected from the group consisting of co-, ter-, and tetrapolymers containing at least one basic amino nitrogen addition type polymer, prepared by the complete polymerization of at least one amine-free alkyl methacrylate monomer and at least one basic nitrogen-containing dialkylaminoalkyl monomer, the ratio of said alkyl methacrylate monomer to said dialkylaminoalkyl monomer in the polymer ranging from about 10:1 to about 25:1, and
(b) at least one nitrogen-containing additive selected from the group consisting of N,N'-disalicylidene-1,2-ethane diamine, N,N'-disalicylidene-1,2-propane diamine and p - aminodiphenylamine dialkanoates, wherein the dialkanoate moiety contains from 4 to 20 carbon atoms.

CROSS REFERENCE TO RELATED APPLICATION

This application is related to co-assigned S.N. 681,917 filed Nov. 9, 1967.

This invention concerns composition and processes for extending the operational life of chemical processing equipment.

More particularly, this invention relates to novel compositions useful as fouling inhibitors in the processing and treatment of petroleum derived products.

The economics of high temperature chemical processing, particularly continuous processing, require uninterrupted and extended periods of operation to be profitable. Not only is start-up time consuming and disproportionately expensive but unplanned repair and maintenance work are disruptive in achieving production schedules.

In the refining and processing of petroleum products many of the surfaces of operating units come into frequent contact with crude and corrosive materials at temperatures ranging between 200° F. and 1200° F. and higher and eventually become coated with deposits of oil-insoluble materials. This is particularly a problem in the case of equipment such as reactors, heat exchangers, pumps, distillation columns, boilers, catalytic crackers and the like. The built up deposits of the fouling material function as an insulating material and cause problems such as:

(1) decreased heat transfer
(2) costly overfiring to compensate for heat transfer losses
(3) expensive and frequent periods of "down" time to remove fouling deposits from coated parts
(4) reduced or lost production.

In petroleum refining operations, the nature of the fouling deposits varies according to the type of operation conducted, the purity of the petroleum derived material and the mechanism by which the deposition is formed. Experience within the petroleum industry has shown that the oil-insoluble fouling deposits fall within four main categories:

(a) high molecular weight polymer,
(b) trace metals, particularly heavy metals and metals of the iron group,
(c) organic peroxides, and
(d) inorganic salts.

In view of the considerable divergence in the possible type of foulants encountered, until recently most anti-fouling compositions required the presence of several components to be effective. What has been sought are relatively simple and inexpensive anti-fouling compositions which are stable upon storage and during use and which are capable of inhibiting fouling in the spectrum of petroleum materials ranging from crudes through the various light, intermediate and heavy hydrocarbon distillates including lubricating distillates, gas/oils, kerosenes and the like. Anti-fouling compositions possessing this unusual combination of properties would represent a useful advance in the art.

It is an object of this invention among others to provide a two component anti-fouling composition useful in the inhibition of fouling deposits in high temperature processing operations.

It is a more specific object of this invention to provide fouling inhibition in a wide variety of petroleum refining operations ranging from the treatment of crudes to lube oils, gas oils and various other distillates.

Another object of this invention is the development of an anti-foulant composition whose anti-fouling activity is substantially greater than the sum of the activities of the individual components used alone.

A more specific object is to provide an anti-fouling composition which can almost double the operational life of operational units used in the high temperature treatment of hydrocarbon streams.

Additional objects will suggest themselves to those skilled in the art after a further reading of this application.

In practice, a material derived from petroleum treating or refining operations is treated with a composition defined below using treatment methods of the art until an anti-fouling amount is present in the material. The material can then be processed in the usual manner and provides a substantial reduction of fouling compared to the untreated petroleum material.

The anti-fouling composition comprises
A major amount of an oil-soluble, basic amino nitrogen-containing addition-type polymer of a plurality of polymerizable ethylenically unsaturated compounds, wherein at least one of said polymerizable ethylenically unsaturated compounds is amine-free and contains from 8 to about 18 carbon atoms, and which is located in an aliphatic hydrocarbon chain, which, though in the polymer, is not part of the main polymer chain, and another unsaturated compound which, as it exists in the polymer, contains from about 0.1 to 3.5% by weight of basic amino-nitrogen, and A minor amount of at least one nitrogen containing additive selected from the group consisting of:
(a) The Schiff's base condensates derived from condensing an aromatic aldehyde with aliphatic polyamines.
(b) The aromatic amides produced by reacting an aromatic amine with aliphatic acids, aliphatic anhydrides or aliphatic acid halides.

In the preferred practice a hydrocarbon liquid to be treated is contacted with from about 7 to 35 parts by million (2 to 10 pounds per thousand barrels) of an admixture of:
(1) A methacrylic co-, ter-, or tetrapolymer containing basic amino nitrogen atoms, prepared by polymerizing at least one alkyl methacrylate monomer with at least one dialkylaminoalkyl methacrylate, the ratio of the alkyl methacrylate monomer to alkylaminoalkyl methacrylate monomer in the polymer ranges from about 10:1 to about 25:1 and (2) At least one member selected from the group consisting of:

(a) The Schiff's base condensates derived from condensing an aromatic hydroxylated aldehyde with aliphatic polyamines having 2 to 6 carbon atoms, and (b) The diphenyl amides produced by reacting a diphenyl amine with an aliphatic acid, acid chloride or anhydride containing 6 to 16 carbon atoms, said ratio of the methacrylic polymer to the nitrogen containing additive ranging from about 1:1 to about 10:1.

To more clearly set forth the salient details of this invention, the following additional description is submitted.

(I) ANTI-FOULING COMPOSITION (A) Oil soluble basic amino nitrogen containing polymers. These polymers when prepared as described in U.S. 2,737,452 are produced by the complete polymerization of at least two monomers, at least one containing basic amino nitrogens and a plurality of polymerizable ethylenic sites, and at least one which is amine free and which contains from 8 to about 18 carbon atoms in an aliphatic hydrocarbon chain. Illustrative amine-free monomers which can be used include the alkyl methacrylates such as butyl methacrylates, pentyl methacrylates, hexyl methacrylates, heptyl methacrylates, octyl methacrylates, decyl methacrylates, stearyl methacrylate, lauryl methacrylate as well as their mixtures.

Methacrylic monomers containing basic amine nitrogen functions which can be used include diethyl aminopropyl methacrylate, dimethylaminoethyl methacrylate, the propylaminoethyl methacrylates and the butylaminobutyl methacrylates as well as their aromatic counterparts. The latter include phenylaminomethyl methacrylate and tosylaminoethyl methacrylate.

Illustrative useful oil soluble methacrylate polymers include copolymers such as the n-octyl methacrylate-diethylaminoethyl methacrylate, decyl methacrylate - diethylaminoethyl methacrylate, ethyl methacrylate - diethylaminoethyl - methacrylate lauryl methacrylate-diethylaminoethyl methacrylate, tridecyl methacrylate - dimethylaminoethyl methacrylate and the like, terpolymers such as lauryl methacrylate - methacrylanilide - diethylaminoethyl methacrylate, decyl methacrylate-methacrylanilide-diethylaminoethyl methacrylate, and the favored tetrapolymers such as butyl methacrylate - dimethylaminoethyl methacrylate - stearyl methacrylate - hexyl methacrylate, diethyl - aminopropyl methacrylate - 2 - ethylhexyl methacrylate - octyl methacrylate - lauryl methacrylate and the like.

A detailed description of the conditions required for polymerizing these polymers appears in the aforementioned patent.

(B) Nitrogen containing additive — as disclosed supra, the nitrogen containing additives are selected from two groups of compounds.

(1) Aromatic Schiff's bases formed from the condensation of aromatic aldehydes, particularly those containing active hydroxyl groups with aliphatic polyamines, and (2) Aromatic amides formed by the reaction of aromatic amines, particularly diphenylamines with aliphatic acids, anhydrides and acid halides.

A listing of illustrative aldehydes and polyamines follows:

AROMATIC ALDEHYDES

Benzaldehyde, 2 - methylbenzaldehyde, 3 - methyl-benzaldehyde, 4 - methylbenzaldehyde, 2 - methoxybenzaldehyde, 4 - methoxybenzaldehyde, α - naphthaldehyde, β-naphthaldehyde, 2 - hydroxybenzaldehyde (salicylaldehyde), 2 - hydroxy - 6 - methyl benzaldehyde, 2-hydroxy-3-methoxybenzaldehyde and the like.

ALIPHATIC POLYAMINES

Ethylenediamine, 1, 2 - propylenediamine, 1,3 - propylenediamine, 1,6 - hexamethylenediamine, 1,10 - decamethylenediamine, diethylenetriamine, triethylenetetramine, pentaerythritoltetramine and the like.

ILLUSTRATIVE AROMATIC AMINES

Aniline, phenylene - diamine, triamino - benzene, diphenylamine, o - toluidine, m - toluidine, p - toluidine, benzylamine, 2,3 - toluylene - diamine, 2,4 - toluylene-diamine, 2,5 - toluylene - diamine, 2,6 - toluylene diamine, 3,4-toluylene diamine, 3,5 - toluylene - diamine, o-aminodiphenyl-amine, p-amino-diphenylamine, etc.

ILLUSTRATIVE ALIPHATIC ACIDS, ANHYDRIDES AND ACID HALIDES

Generally speaking any of the aliphatic acids, anhydrides or acid halides, straight chain or branched chain, can be reacted with the aromatic amines to produce the desired amide additives of this invention. These include particularly those acid halides and anhydrides having a carbon chain length varying between 4 and 20 carbon atoms. Useful aliphatic acid halides include the acid chlorides corresponding to the fatty aliphatic acids such as acetic, propanoic, butanoic, hexanoic, octanoic, nonanoic, decanoic, undecanoic as well as their bromine analogues. While the acid chlorides are preferred because of their activity, low cost and availability, where desired the more sluggishly reactive acids or anhydrides may be employed. The reaction conditions used in the preperation of the aromatic amides are well known and can be found in the technical or patent literature.

(II) PREFERRED ANTI-FOULING COMPOSITIONS

While all of the previously described combinations of "oil soluble polymers" and nitrogen containing additives function satisfactorily as anti-foulants, as in the case in any large group certain individual members of the group function more effectively than the group at large, and are therefore preferred. In this instance the following two methacrylate tetrapolymers used in the indicated proportions in conjunction with a specific Schiff's base or aromatic amide represent the preferred compositions:

Five to one parts by weight of the tetrapolymer selected from the group consisting of (a) the tetrapolymer of butyl methacrylate-lauryl methacrylate-stearyl methacrylate-dimethylaminoethyl methacrylate, and (b) butyl methacrylate-isodecyl methacrylate-stearyl methacrylate and dimethylaminoethyl methacrylate, combined with each part by weight of nitrogen additive selected from the group consisting of N, N' disalicylidene-1,2-propane diamine and para-aminodiphenylamine dioctanoate.

The structure of p-aminodiphenylamine dioctanoate is shown below:

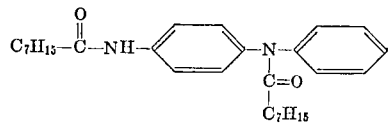

(III) FEED STOCKS WHICH CAN BE TREATED

The inventive anti-foulants can be employed in crude petroleum streams as well as in the treatment of components of products derived from crude petroleum. These include light distillates such as light naphthas, intermediate naphthas, heavy naphthas, middle distillates such as kerosene, gas oil, distillate lube stocks, for example, white oil, saturating oil, light lubes, medium lubes and heavy lubes. Further petroleum substrates include refined hydrocarbons such as xylene, benzene, etc., and in some instances in the processing of non-hydrocarbons such as alcohols, phenols, etc.

(IV) CONCENTRATION OF ANTI-FOULANT USED AND METHOD OF TREATING

The amount of anti-fouling agent required for effective inhibition is a variable dependent upon the source of the petroleum substrate treated, e.g., a sour crude or a highly refined xylene, the temperatures and pressures employed as well as the components of the anti-fouling compositions used. In general, where a particular petroleum substrate has not been treated before, it is beneficial at first to use relatively high treatment levels of the anti-fouling compositions diluted in a suitable compatible solvent or solvents and then to reduce the treatment level to the point where fouling is barely eliminated. A convenient mode of expressing the concentrations required is in the form of a range either expressed as parts by million of stock treated (p.p.m.) or on the basis of pounds of composition added per thousand barrels of stock (p.t.b.) Satisfactory inhibition of fouling in most feedstock streams can be obtained under practically all conditions encountered between about 1 to 50 pounds of anti-foulant per thousand barrels of stock, or about 3.5 to 175 p.p.m. when expressed in parts per million. Lower concentrations tend toward erratic results and higher concentrations are limited by cost. A narrow concentration range of from about 2 to about 10 p.t.b. (7–35 p.p.m.) is more usually employed.

The ratio of oil soluble polymer to nitrogen containing additive ranges between 1:1 to about 10:1. The above concentrations and ratios are herein referred to as an "anti-fouling" or "inhibiting" amount of anti-foulant.

No special method of treating the feedstock is required. The components can be applied individually or as an admixture. Compatible solvents may be a convenience in handling the relatively small quantities of material but the anti-foulants can be added directly without dilution. The anti-fouling compositions can be applied batchwise or continuously. In the latter instance a proportioning pump or comparable device may be used to inject the compositions into the stream being treated.

(V) EVALUATION OF FOULING

Two general methods are employed, actual refinery use or simulated use. In the plant trials the lengtth of time that a given unit can be operated without the need for defouling maintenance is noted and compared to the average run of a comparable unit untreated. Also noted are the heat transfer values of the unit toward the end of an operating cycle.

In the simulated plant trials the procedure designated as the CFR Coker Test is employed. In this ASTM procedure (Method D–1660), the tendency of a treated stock material to deposit a fouling coating in a preheater or heat exchanger tube at an elevated temperature is noted and compared to the behavior of an untreated stock under the same conditions. For example in actual practice the filtered stock under test is charged at a 6 lbs. per hour flow rate over an electrically heated preheater tube which heats the test fraction to a specified temperature usually about 425° F. From the preheater section the sample is passed thru a stainless steel filter electrically heated to about 500° F. When sufficient oil insoluble material clogs the filter so that a substantial pressure drop is recorded the test is terminated. Ordinarily a pressure drop of 25.0 inches of mercury terminates the test.

The following embodiments and examples are submitted to further aid in the understanding of this invention. Unless otherwise specified all percentages and parts are understood to be by weight rather than volume.

Embodiment A—Preparation of a preferred methacrylic polymer

To a reaction kettle equipped with a means of providing stirring, heating, cooling and inert atmosphere is added 4200 parts by weight of butyl methacrylate and 22 parts by weight of azobisisobutyronitrile. The mixture is stirred until dissolved and 800 parts by weight of dimethylaminoethyl methacrylate, 10600 parts by weight of lauryl methacrylate and 4400 parts by weight stearyl methacrylate are added with stirring. At this time 28,600 parts by weight of refined paraffin distillate (150 SU viscosity at 100° F.) is added to the mixture and the reaction mixture is purged with nitrogen gas while stirring for about ½ hour. Then a nitrogen atmosphere (blanket) is maintained over the reaction mixture and the reaction mixture is heated at about 85° C. until a constant value in the refractive index indicates that the polymerization reaction is near completion. At this time an additional 4 parts by weight of azobisisobutyronitrile in benzene is added dropwise to assure that all monomer is polymerized. After an additional 20 minutes of heating and stirring at 85° C. the temperature is raised to 100° C. and kept there until the refractive index shows the reaction is complete.

Embodiment B—Preparation of another preferred methacrylic polymer

In this embodiment the same procedure used to prepare the methacrylic polymer of embodiment A is followed, the only difference being in the use of isodecyl methacrylate instead of lauryl methacrylate. The same catalyst is employed. The quantities (by weight) of the 4 monomers that are used appear below:

| Monomer: | Parts by wt. |
| --- | --- |
| Butyl methacrylate | 21 |
| Stearyl methacrylate | 40 |
| Dimethylaminoethyl methacrylate | 4 |
| Isodecyl methacrylate | 35 |

After dissolution, purging and heating in a nitrogen atmosphere, and adding additional catalyst to assure the completion of the polymerization reaction, the mixture is heated to 100° C. and kept there until the refractive index indicates the polymerization is complete.

Embodiment C—Preparation of N,N¹-disalicylalpropylenediamine from the condensation of salicylaldehyde and propylene diamine To a suitable reaction vessel equipped with stirring, heating, cooling and refluxing means is added 692 parts by weight of salicylaldehyde dissolved in 200 parts by weight of benzene. Then gradually with stirring is added 210 parts by weight of propylene diamine. The exothermic heat of reaction causes the reaction mixture to reflux and the refluxing is continued until the addition of diamine is complete, and the water is stripped off. The product is a benzene solution of the additive which facilitates handling. Analysis confirms that the desired product is obtained.

Embodiment D—Preparation of a preferred aromatic amide, p-aminodiphenylamine dioctanoate To a reaction vessel equipped with a reflux condenser, heating and stirring means are added at room temperature, 122 parts by weight of p-aminodiphenylamine, 219 parts by weight of octanoyl chloride and 450 parts by weight of toluene. The reaction mixture is gradually heated to reflux and begins to evolve hydrogen chloride at about 90° C. The reaction mixture is refluxed for 4 hours then percolated through silica gel. At this time volatiles are stripped off leaving a yellow to amber oil which slowly crystallizes to a yellow glassy solid. Elemental analysis confirms that the desired amide is present.

To set forth the inventive concept in the greatest possible detail, the following illustrative examples are submitted. Unless otherwise specified all parts are by weight not volume.

Example 1—Evaluation of an anti-fouling composition comprising the polymer of embodiment A and the Schiff's Base of embodiment C.

In this example a kerosene stock untreated and treated with varying quantities of the individual components of the anti-fouling composition are evaluated in the previously described CFR Coker Test. As a means of comparison a commercially available anti-fouling composition of the dispersant type[1] is evaluated at comparable concentration.

The base kerosene stock has the following properties:

Tests: Stock 5249K
- Gravity, ° API _____ 42.6
- Color, Saybolt _____ 18
- Color stability _____ 16
- Sulfur, wt. percent, X-ray _____ 0.059
- Mercaptan sulfur, g./l. _____ 0.085
- Gum, existent, mg./100 ml. _____ 1.0
- Gum, potential, mg./100 ml. _____ 4.0
- Nitrogen, basic, p.p.m. _____ 4.0
- Nitrogen, total, p.p.m. _____ 4.8
- Organic acidity, mg. KOH/gm. _____ 0.09
- Copper content p.p.b. _____ 47
- Percent aromatics/olefins _____ 14.9/0.7
- Water separometer index modified _____ 94

The flow rate of the filtered charge is 6 lbs. per hour over the preheater tube electrically heated to 425° F. and the filter heated to 500° F. The heated sample passes from the preheater section thru the filter. The test was run for 300 minutes or until a drop of 25.0 inches of mercury is obtained whichever comes first. The results are given in Table I.

TABLE I

| Charge | Conc. PTB | ΔP, in. Hg | Time to clog filter | Preheater tube deposits |
|---|---|---|---|---|
| Kerosene (k) | 0 | 25 | 148 | Moderate. |
| K plus polymer of embodiment A | 2 | 0.2 | 300 | Do. |
| Do | 5 | 0.1 | 300 | Do. |
| K plus Schiff's base of embodiment C | 5 | 25 | 149 | Small. |
| K plus embodiment A and Embodiment C | 2.0 + 0.5 | 0 | 300 | Do. |
| K plus BT-12 | 2.0 | 0.3 | 300 | Moderate. |
| | 5.0 | 0.1 | 300 | Do. |

As can be seen by the above data untreated kerosene stock clogged the filter to the extent that a 25" drop in mercury pressure was obtained in 148 minutes and a moderate deposit of foulant resulted.

While the 2 and 5 p.t.b. level of the methacrylate of embodiment A prevent clogging, moderate deposits were observed. The Schiff's base of embodiment C at the 5 p.t.b. level on the other hand clogged the filter at 149 minutes although only a small amount of deposits was formed.

The admixture of the polymer of embodiment A and the Schiff's base of embodiment C, even at relatively low p.t.b. levels (2 and 0.5) respectively did not clog the filter and gave only a small amount of deposits on the preheater tube.

It should be noted that while the commercially sold anti-fouling composition did prevent clogging a moderate amount of deposit formed upon the preheater tube even when twice the concentration level is employed.

Example 2.—Evaluation of an anti-fouling composition comprising the polymer of embodiment B and the Schiff's base of embodiment C In this example the base kerosene stock was again employed as control. Samples of this stock were treated with 2 and 5 p.t.b. concentration levels of the polymer of embodiment B used alone, another kerosene sample is treated with 5 p.t.b. of the Schiff's base of embodiment C alone and yet another with an admixture of 10 p.t.b. of the polymer of embodiment B and 2.5 parts of the Schiff's base of embodiment C.

Again as in Example 1, the individual components allowed a moderate build-up of deposits in the preheater tube while the tested concentration of the admixture permitted no visible deposit build-up.

Example 3.—Evaluation of an anti-fouling composition comprising the polymer of embodiment A and the aromatic amide of embodiment D In this example a kerosene hydroheater feedstock (KHFS) is evaluated as in Example 1 using the untreated control, the kerosene stock plus the individual components, the kerosene stock plus the inventive admixture and the kerosene stock plus the commercially available anti-fouling composition of Example 1 (BT-12).

The kerosene hydroheater feedstock has the following properties:

Tests:
- Gravity, ° API _____ 44.3
- Color, Saybolt _____ 19
- Sulfur, weight percent _____ 0.064
- Mercaptan, sulfur, g./l. _____ 0.108
- Nitrogen, basic, p.p.m. _____ 1.5
- Nitrogen, total, p.p.m. _____ 5.0
- Copper content, p.p.b. _____ 47
- Percent aromatics/olefins _____ 14.3/0.6
- Water separometer index modified _____ 74

Distillation, ASTM, ° F.:
- IBP _____ 322
- 5% _____ 350
- 10% _____ 356
- 50% _____ 408
- 90% _____ 469
- EP _____ 514

The test results appear in Table II.

[1] Coded as BT-12, composition is (1) 59% by weight of a copolymer of isobutylene and organic acid, 5% by weight of nonylphenol type derivative, 36% by weight xylene.

TABLE II

| Charge | Conc. PTB | ΔP, in. Hg | Time (minutes) clog filter | Preheater tube deposits |
|---|---|---|---|---|
| KHFS | 0 | 25.0 | 150 | Moderate, black deposits. |
| KHFS plus Emb. A (Polymer) | 5 | 0.2 | 300 | Moderate-heavy black deposits. |
| KHFS plus Emb. D (aromatic amide) | 5 | 25.0 | 100 | Small amt. brown deposits. |
| KHFS plus Emb. A plus Emb. D | 3.32 + 1.66 | 0.0 | 300 | Small amt. light brown to brown deposits. |
| KHFS plus BT-12 | 5 | 0.3 | 300 | Moderate to heavy amount of black deposits |

Again as was the case in Example 1, the admixture of the components (methacrylic polymer of embodiment A with the aromatic amide of embodiment D) is substantially superior to the individual components used alone.

As the preceding embodiments, examples and discussion have indicated, this invention is both advantageous and unexpected in view of the prior art. For example, the antifouling compositions of this invention are effective inhibitors of fouling in a variety of petroleum derived products even at relatively low concentration levels. In addition the combination of the oil insoluble polymer with the nitrogen containing additive gives substantially better inhibition of fouling than do the same components used individually. Further advantages will suggest themselves upon the practice of this invention.

Various changes, modifications and substitutions can be made in the reactants, reaction conditions and the like without departing from the inventive concept. The metes and bounds of this invention are best determined by the claims which follow taken in conjunction with the specification.

What is claimed is:

1. A process for inhibiting fouling in chemical processing and oil refining equipment used to process and refine petroleum derived stock material, comprising treating said petroleum derived stock material prior to processing with an anti-fouling amount of a composition comprising:
   (a) an oil-soluble basic amino nitrogen containing addition-type alkylmethacrylate polymer selected from the group consisting of co-, ter- and tetrapolymers containing in polymerized form at least one amine-free polymerizable ethylenically unsaturated alkyl methacrylate monomer containing from 8 to 18 carbon atoms and at least one basic amino-containing dialkylaminoalkyl methacrylate monomer wherein the alkyl moiety contains from 1 to 6 carbon atoms, and the ratio of said alkylmethacrylate monomer to said dialkylaminoalkyl methacrylate monomer in the polymer ranges from about 10:1 to about 25:1, said alkylmethacrylate polymer containing from about 0.1 to 3.5% by weight of basic amino nitrogen, and
   (b) at least one nitrogen containing, anti-fouling additive selected from the group consisting of N,N'-disalicylidene, 1,2-propane diamine, N,N'-disalicylidene, 1,2-ethane diamine and p-aminodiphenylamine dialkanoates wherein the alkanoate moiety of said dialkanoate contains 4 to 20 carbon atoms.

2. The process of claim 1 wherein the addition-type polymer is a copolymer.

3. The process of claim 1 wherein the addition-type polymer is a terpolymer.

4. The process of claim 1 wherein the addition-type polymer is a tetrapolymer.

5. The process of claim 4 wherein the nitrogen-containing anti-fouling additive is N,N'-disalicylidene, 1,2-propane diamine.

6. The process of claim 4 wherein the nitrogen-containing, anti-fouling additive is p-aminodiphenyl dioctanoate.

7. The process of claim 4 wherein the petroleum derived stock material is a kerosene distillate.

8. The process of claim 4 wherein the petroleum derived stock material is a crude oil.

9. The process of claim 4 wherein the petroleum derived stock material is a gas oil.

10. A process for inhibiting fouling in chemical processing and oil refining equipment used to process and refine petroleum-derived stock material, comprising treating such petroleum-derived stock material with an anti-fouling amount of a composition comprising:
    (a) an oil-soluble basic amino nitrogen containing alkylmethacrylate type tetrapolymer comprising, prior to polymerization:
        (1) at least one polymerizable amino-free ethylenically unsaturated, alkyl methacrylate monomer containing from 8 to 18 carbon atoms, and
        (2) at least one basic amino-containing dialkylaminoalkyl methacrylate monomer, the ratio of said alkyl methacrylate monomer to said dialkylaminoalkyl methacrylate monomer in the polymer ranging from about 10:1 to about 25:1, said alkylmethacrylate polymer containing from about 0.1 to 3.5% by weight of basic amino nitrogen, and
    (3) at least one nitrogen-containing, anti-fouling additive selected from the group consisting of:
        (a) N,N'-disalicylidene, 1,2-propane diamine
        (b) N,N'-disalicylidene, 1,2-ethane diamine
        (c) p - aminodiphenylamine dialkanoates wherein the alkanoate moiety of the dialkanoate contains from 4 to 20 carbon atoms.

11. The process of claim 10 wherein, prior to polymerization, the oil-soluble basic amino nitrogen-containing alkylmethacrylate polymer comprises butyl methacrylate, lauryl methacrylate, stearyl methacrylate and dimethylaminoethyl methacrylate monomers.

12. The process of claim 11 wherein the nitrogen-containing, anti-fouling additive is N,N'-disalicylidene, 1,2-propane diamine.

13. The process of claim 11 wherein the nitrogen-containing, anti-fouling additive is N,N'-disalicylidene, 1,2-ethane diamine.

14. The process of claim 11 wherein the nitrogen-containing, anti-fouling additive is p-aminodiphenyldioctanoate.

15. An anti-fouling composition suitable for inhibiting the fouling of petroleum derived stock material comprising the following components in the proportions indicated:
    (a) from about 10 to 1 parts by weight of an oil-soluble basic amino nitrogen-containing addition type alkylmethacrylate polymer selected from the group consisting of co-, ter- and tetrapolymers containing in combined form, prior to polymerization, as its essential components at least one amine-free polymerizable, ethylenically unsaturated alkylmethacrylate monomer, containing from 8 to 18 carbon atoms and at least one basic amino-containing dialkylaminoalkyl methacrylate monomer, the ratio of said alkylmethacrylate monomer to said dialkylaminoalkyl methacrylate monomer in the polymer ranging from about 10:1 to 25:1, said alkylmethacrylate polymer containing from about 0.1 to 3.5% by weight of basic amino nitrogen, and:
    (b) for each part by weight of at least one nitrogen containing antifouling additive selected from the group consisting of N,N'-disalicylidene - 1,2-propane diamine, N,N'-disalicylidene-1,2-ethane diamine and p-aminodiphenylamine dialkanoates, wherein the alkanoate moiety of said dialkanoate contains from 4 to 20 carbon atoms.

16. An anti-fouling composition suitable for inhibiting the fouling of petroleum derived stock material comprising:
    (1) from about 10 to 1 parts by weight of an oil-soluble, basic amino nitrogen-containing alkylmethacrylate tetrapolymer comprising prior to polymerization:
        (a) at least one amino-free polymerizable ethylenically unsaturated alkyl methacrylate monomer containing 8 to 18 carbon atoms, and
        (b) at least one basic amino containing dialkylaminoalkyl methacrylate monomer wherein the alkyl moiety contains 1 to 6 carbon atoms and the ratio of said alkyl methacrylate monomer to said dialkylaminoalkyl methacrylate monomer in the tetrapolymer ranges from about 10:1 to about 25:1, said tetrapolymer containing from about 0.1 to 3.5% by weight of basic amino nitrogen, and
    (2) at least one nitrogen containing anti-fouling additive selected from the group consisting of:

(a) N,N'-disalicylidene, 1,2-propane diamine,
(b) N,N'-disalicylidene, 1,2-ethane diamine, and
(c) p-aminodiphenylamine dialkanoate wherein the alkanoate moiety of the dialkanoate contains from 4 to 20 carbon atoms.

17. The anti-fouling composition of claim 16 wherein said tetrapolymer comprises butyl methacrylate, lauryl methacrylate, stearyl methacrylate and dimethylaminoethyl methacrylate.

18. The anti-fouling composition of claim 17 wherein the nitrogen-containing, anti-fouling additive is N,N'-disalicylidene, 1,2-propane diamine.

19. The anti-fouling composition of claim 18 wherein the nitrogen-containing, anti-fouling additive is N,N'-disalicylidene, 1,2-ethane diamine.

20. The anti-fouling composition of claim 16 wherein the p-aminodiphenylamine dialkanoate is p-aminodiphenylamine dioctanoate.

References Cited
UNITED STATES PATENTS

| | | | |
|---|---|---|---|
| 2,737,452 | 6/1967 | Catlin et al. | 44—62 |
| 3,218,137 | 11/1965 | Belo et al. | 44—66 |
| 3,222,145 | 12/1965 | Belo et al. | 44—66 |
| 3,269,808 | 8/1966 | Churchill et al. | 44—62 |
| 3,271,296 | 9/1966 | Gonzales | 208—48 |
| 3,326,975 | 6/1967 | Lappin | 260—561 |
| 3,390,073 | 6/1968 | Godar et al. | 208—48 |
| 3,437,583 | 4/1969 | Gonzales | 208—48 |

DELBERT E. GANTZ, Primary Examiner

G. E. SCHMITKONS, Assistant Examiner

U.S. Cl. X.R.

44—62